March 26, 1968 G. L. McCOLM 3,374,948

CALENDAR CALCULATOR

Filed Oct. 21, 1965

INVENTOR
GEORGE L. McCOLM
BY Bauyer and Witherspoon
ATTORNEYS

United States Patent Office 3,374,948

Patented Mar. 26, 1968

3,374,948

CALENDAR CALCULATOR

George L. McColm, 6 Boatclub Road, Poona 1, India

Filed Oct. 21, 1965, Ser. No. 500,051
3 Claims. (Cl. 235—88)

ABSTRACT OF THE DISCLOSURE

This invention relates to a calendar calculator including a base having a circle therein divided into 365 equal parts numbering consecutively from 0 to 365. A first disc is rotatably mounted on the base concentrically with the circle and is also divided into 365 equal portions and designated with the months and days of each month consecutively. A second disc is rotatably mounted on the base above the first disc and concentrically therewith. The second disc is also divided into 365 equal segments and bears indicia indicating consecutively every 7th day of the week. The indicia on the base and first and second discs are so positioned as to provide ready alignment and reading of values as needed whereby the indicia on the second disc may be selectively aligned with the indicia on the first disc to indicate on what dates a specific day of the week falls throughout the year and whereby by aligning a specific date on the first disc with the zero number on the base indicia the elapsed days from this date to any date on the first disc may be determined by reading the number on the base indicia aligned with said date.

The device of this invention is quite useful in providing such interesting data as "days to Christmas," "days to Thanksgiving" and similar matters. Not only will the calendar provide information as to the number of days between specific calendar dates, it will also designate the day of the week on which the period begins and ends. The advantages of such a calculator are at once apparent. For example, in the planning of events a device of this type would speed up solutions tremendously. Farmers find the calculator useful in setting up planting dates.

In view of the foregoing, it is an object of this invention to provide a calculator which will determine the number of days between specific calendar dates and the day of the week on which the period starts and terminates.

It is another object to provide a calculator as set forth above which is sturdy, accurate, easy to use and of simple and inexpensive construction.

Figure 1:
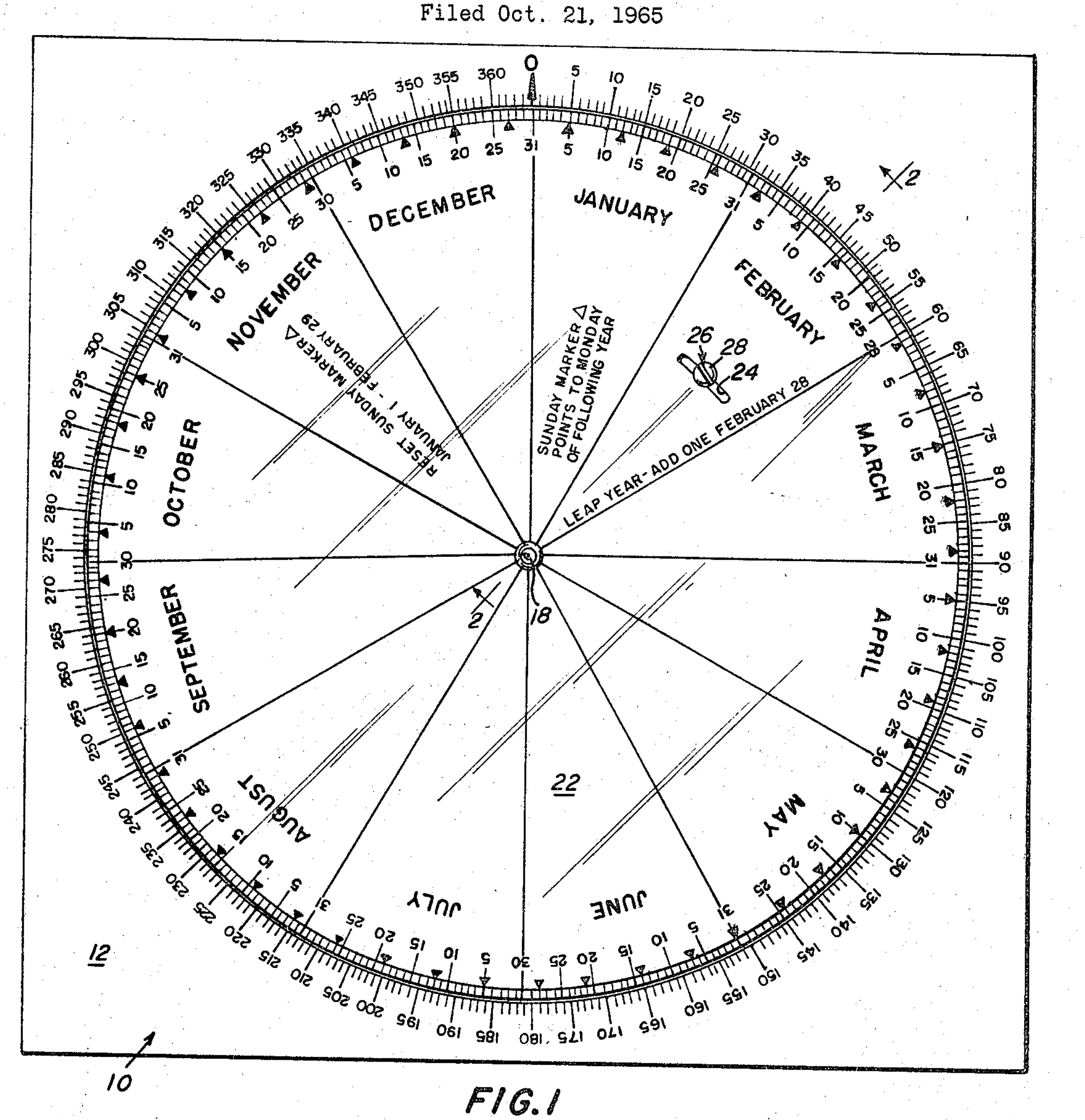
Figure 2:
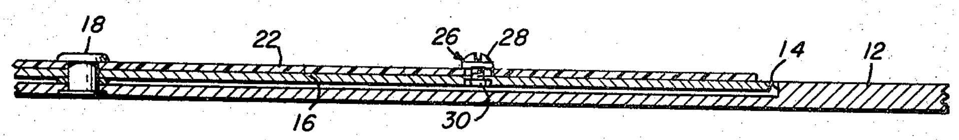

The foregoing and additional objects and advantages will become apparent when taken in conjunction with the following detailed description and drawing, showing by way of example a preferred embodiment and wherein:

FIG. 1 is a top plan view of the calculator of this invention showing the three scales, namely number of days in the year, the months and days of each month and the week marker, and FIG. 2 is a cross sectional view taken along line 2—2 of FIG. 1 showing the relative vertical position of the two rotatable discs and the means for securing same together.

Referring to FIGS. 1 and 2 of the drawing, the calendar calculator 10 comprises a base 12 made of any suitable material having a circular recess 14 formed therein. The peripheral edge of the base 12 immediately adjacent the recess 14 is divided into 365 equal spaces and so designated and numbered to correspond to the number of days in a normal year. This indicia scale is known as the "cumulative day scale."

A disc 16 having a diameter slightly less than that of recess 14 is rotatably mounted in this recess by means of pin 18 centrally mounted in base 12. Disc 16 has its periphery divided into 365 equal portions to represent the days of the year. After this, the device is divided into twelve segments defining the months of the year and the respective days in each month in order. This disc divided as previously described has indicia applied to indicate such divisions and is known as the "month designation" scale.

A second disc 22 is likewise rotatably mounted on pin 18 as indicated in FIG. 2. This second disc 22 is in sliding contact with the surface of disc 16 on which it rests, and is slightly smaller in diameter than disc 16. This disc is divided into a number of segments which in this instance are spaced at seven-three hundred sixty-fifths of the disc periphery thereby designating the span of a week. Thus each triangular marking on disc 22 as illustrated in FIG. 1 designates the same recurring day of the week for the entire year. thereby causing the scale to be known as the "day of the week" scale.

Since the "day of the week" scale must be adjusted for the specific calendar year involved, means must be provided for mounting discs 16 and 22 in fixed relative rotational position. This means comprises an arcuate slot 24 formed in the disc 22. A screw 26 having a cap portion 28 fits down through the slot 24 so that its cap will engage the disc 22. Disc 16 has an aperture receiving nut 30 into which screw 26 fits. Thus the screw 26 serves to hold discs 16 and 22 in fixed relative rotational position when properly tightened.

The indicia on the base and the discs 16 and 22 are so arranged adjacent the peripheries of the discs and the edge surrounding the recess 14 that the cumulative day scale, the month designation scale and the day of the week scale are adjacent one another to provide for easy alignment and subsequent reading.

Although the use of the device is more or less apparent, an example of one use will be given for purposes of illustration. It should be noted that the cumulative day scale starts at 0 and has an arrow to indicate that this is the index point from which calculations by way of disc adjustment or movement occurs.

The first step to be taken is the alignment of the day of the week scale with the month designation scale. Assume that the day designated by the triangular marking is Sunday and it is determined that the first Sunday in January falls on the fifth of the month, then the first triangular marking 30 will be brought into alignment with the fifth of January on the month designation scale. The two discs 16 and 22 will then be locked together in such position by means of screw 26. Some special means may be used to identify the first or index position on the day of the week scale in order to avoid confusion.

Next, assume that it is desired to know the number of days between Dec. 31 and Apr. 15 and on which day Apr. 15 falls. With discs 16 and 22 locked together, they are rotated until the specific day in the month designation scale on disc 16 is aligned with index point 0 and marked with an arrow, in this instance Dec. 31. Then the month designation scale is traversed clockwise until Apr. 15 is reached. They by reaching the number designation on the cumulative day scale aligned therewith the elapsed days will be noted, namely 105, and Apr. 15 will be a Wednesday since the triangular designations represent Sunday, it is easy to count backward or forward to ascertain this. Other uses for calculating times between given dates will be readily apparent from the above explanation.

In a leap year wherein February has twenty-nine days, it will be necessary to reset the discs 16 and 22 in order to take into consideration this extra day. Hence, on leap years an adjustment must be made on Jan. 1 and Feb. 29 to make the scales on discs 16 and 22 work out.

This calendar calculator may be made from any suitable material depending on the environment and use to which the device will be put. In general, the disc 22 can advantageously be made of some transparent material.

I claim:

1. A device for calculating elapsed time between respective calendar dates and for determining the specific day of the week on which the period starts and terminates, said device comprising a base having a circle thereon, said circle being divided into 365 equal parts and numbered consecutively from 0 to 365, a first disc rotatably mounted on the base and concentric with the circle thereon, said first disc being divided into 365 equal peripheral portions and further divided into twelve segments corresponding consecutively to the months of the year and the days in each month, indicia on said first disc indicating the months and days into which the said disc is divided, a second disc rotatably mounted on the base above the first disc and concentric therewith, said second disc being divided into 365 equal segments, indicia on the second disc indicating consecutively every seventh day of the year, means for securing the second disc and the first disc together, said securing means comprising an aperture in said first disc, an arcuate slot in said second disc, and fastening means inserted in said aperture and slot whereby said discs may be adjusted to compensate for leap year, said fastening means also preventing relative rotational movement between said discs by locking the same after said adjustment has been made, the indicia on the base and first and second discs being so positioned as to provide ready alignment and reading of values as needed whereby the indicia on the second disc may be selectively aligned with the indicia on the first disc to indicate on what dates a specific day of the week falls throughout the year and whereby by aligning a specific date on the first disc with the zero number on the base indicia the elapsed days from this date to any date on the first disc may be determined by reading the number on the base indicia aligned with said date.

2. The invention as set forth in claim 1 and wherein the base is recessed to receive the first and second discs and thus provide a smoother upper surface.

3. The invention as set forth in claim 1 and wherein the second disc is transparent.

References Cited

UNITED STATES PATENTS

| | | | |
|---|---|---|---|
| 1,401,692 | 12/1921 | Harris | 235—88 |
| 1,435,512 | 11/1922 | Boggio | 235—88 |
| 1,447,309 | 3/1923 | Johnson | 235—88 |
| 1,495,805 | 5/1924 | Rooney | 235—88 |
| 2,335,792 | 11/1943 | Roggenkamp | 235—88 |
| 3,253,780 | 5/1966 | Stewart et al. | 235—88 |

RICHARD B. WILKINSON, *Primary Examiner.*

STANLEY A. WAL, *Assistant Examiner.*